(12) United States Patent
Hon et al.

(10) Patent No.: US 10,724,443 B2
(45) Date of Patent: Jul. 28, 2020

(54) TURBINE ENGINE AND METHOD OF OPERATING

(71) Applicant: General Electric Company, Schenectady, NY (US)

(72) Inventors: Robert Charles Hon, Fort Mitchell, OH (US); Thomas Charles Swager, Maineville, OH (US); Andrew Todd Lehmann, Hamilton, OH (US); Michael Scott McCambridge, Symmes Township, OH (US); Thomas Earl Gillingham, Cincinnati, OH (US); Joseph Roger Broda, West Chester, OH (US); Kevin Richard Graziano, Springdale, OH (US); Amid Ansari, Mason, OH (US); Kenneth Lee Kirchmayer, Cincinnati, OH (US); Tod Robert Steen, West Chester, OH (US); Daniel Roy Kiracofe, Cincinnati, OH (US)

(73) Assignee: General Electric Company, Schenectady, NC (US)

( * ) Notice: Subject to any disclaimer, the term of this patent is extended or adjusted under 35 U.S.C. 154(b) by 593 days.

(21) Appl. No.: 15/163,279

(22) Filed: May 24, 2016

(65) Prior Publication Data

US 2017/0342908 A1 Nov. 30, 2017

(51) Int. Cl.
*F02C 7/26* (2006.01)
*F02C 7/27* (2006.01)
(Continued)

(52) U.S. Cl.
CPC .............. *F02C 7/26* (2013.01); *F01D 25/34* (2013.01); *F02C 7/27* (2013.01); *F02C 9/20* (2013.01); *F02C 9/22* (2013.01); *F05D 2220/32* (2013.01); *F05D 2260/85* (2013.01); *F05D 2270/02* (2013.01); *F05D 2270/114* (2013.01)

(58) Field of Classification Search
None
See application file for complete search history.

(56) References Cited

U.S. PATENT DOCUMENTS

| 4,473,752 A | 9/1984 | Cronin |
| 5,122,698 A | 6/1992 | Walker et al. |

(Continued)

FOREIGN PATENT DOCUMENTS

| EP | 2 006 496 A1 | 12/2008 |
| JP | 2010-255522 A | 11/2010 |

OTHER PUBLICATIONS

International Search Report and Written Opinion issued in connection with corresponding PCT Application No. PCT/US2017/030084 dated Jan. 18, 2018.

*Primary Examiner* — Christian Chace
*Assistant Examiner* — Kyung J Kim
(74) *Attorney, Agent, or Firm* — General Electric; Cynthia Parks

(57) ABSTRACT

A method of operating a turbine engine that includes actuating a starter motor of the turbine engine such that a motoring speed of the turbine engine increases, and actuating a plurality of variable stator vanes of the turbine engine such that the plurality of variable stator vanes are at least partially open to control the motoring speed of the turbine engine.

21 Claims, 8 Drawing Sheets

(51) Int. Cl.
*F02C 9/22* (2006.01)
*F02C 9/20* (2006.01)
*F01D 25/34* (2006.01)

(56) References Cited

U.S. PATENT DOCUMENTS

| | | |
|---|---|---|
| 5,123,241 A | 6/1992 | Lotan |
| 6,328,526 B1 | 12/2001 | Seki et al. |
| 6,684,898 B2 | 2/2004 | Wiggins et al. |
| 6,694,746 B2 | 2/2004 | Reed et al. |
| 6,836,086 B1 * | 12/2004 | Goldberg ................ F02C 7/26 318/139 |
| 7,941,281 B2 | 5/2011 | Rai et al. |
| 8,396,689 B2 | 3/2013 | Pfeifer et al. |
| 8,666,580 B2 | 3/2014 | Hashimoto |
| 8,773,049 B2 | 7/2014 | Ramamurthy et al. |
| 8,820,046 B2 | 9/2014 | Ross et al. |
| 8,918,264 B2 | 12/2014 | Jegu et al. |
| 9,108,641 B2 | 8/2015 | Yone et al. |
| 2002/0173897 A1 | 11/2002 | Leamy et al. |
| 2013/0192195 A1 | 8/2013 | Wehmeier |
| 2014/0147245 A1 * | 5/2014 | Payne ...................... F02C 9/20 415/1 |
| 2014/0236451 A1 | 8/2014 | Gerez et al. |
| 2014/0373518 A1 | 12/2014 | Manneville et al. |
| 2014/0373552 A1 | 12/2014 | Zaccaria et al. |
| 2014/0373553 A1 | 12/2014 | Zaccaria et al. |
| 2015/0030438 A1 | 1/2015 | Takahashi et al. |

* cited by examiner

TURBINE ENGINE AND METHOD OF OPERATING

BACKGROUND

The present disclosure relates generally to turbine engines and, more specifically, to systems and methods of mitigating thermal rotor bow in turbine engines.

Turbine engines, such as turbofan engines, experience several different phases of operation including, but not limited to, startup to idle speed, warmup, acceleration to higher power and speed for takeoff, climb, cruise, steady-state, deceleration to lower speed and power for descent, landing and taxi, shutdown, and cool-down. Turbine engines may cycle through the different phases of operation several times a day depending on the use of the aircraft to which the turbine engines are attached. For example, a commercial passenger aircraft typically shuts down its engines in between flights as passengers disembark from the aircraft. As such, residual heat remains in the aircraft's engines, which can cause a phenomenon known as thermal rotor bow. Thermal rotor bow is generally defined by deformation in the rotating and stationary components of the turbine engine. Deformation in the components of the turbine engine can result in contact-related damage between the rotating and stationary components of the turbine engine during engine startup, thereby reducing the service life, performance, and operability of the turbine engine.

Thermal rotor bow is especially prominent at times after engine shutdown, and before the engine is allowed to fully cool. Moreover, many known turbine engines are unable to naturally mitigate thermal rotor bow during startup as the design of modern commercial turbofans shifts towards having higher bypass ratios and greater length-to-diameter ratios, as well as tighter clearances between rotors and stators of the engine.

BRIEF DESCRIPTION

In one aspect, a method of operating a turbine engine is provided. The method includes actuating a starter motor of the turbine engine such that a motoring speed of the turbine engine increases, and actuating a plurality of variable stator vanes of the turbine engine such that the plurality of variable stator vanes are at least partially open to control the motoring speed of the turbine engine.

In another aspect, a turbine engine is provided. The turbine engine includes a starter motor, a compressor assembly including a plurality of variable stator vanes, and a computing device coupled in communication with the starter motor and the plurality of variable stator vanes. The computing device is configured to actuate the starter motor of the turbine engine such that a motoring speed of the turbine engine increases, and actuate the plurality of variable stator vanes such that the plurality of variable stator vanes are at least partially open to control the motoring speed of the turbine engine.

In yet another aspect, a computer-readable medium having computer-executable instructions embodied thereon for use in operating a turbine engine is provided. When executed by at least one processor, the computer-executable instructions cause the processor to actuate a starter motor of the turbine engine such that a motoring speed of the turbine engine increases, and actuate a plurality of variable stator vanes of the turbine engine such that the plurality of variable stator vanes are at least partially open to control the motoring speed of the turbine engine.

DRAWINGS

These and other features, aspects, and advantages of the present disclosure will become better understood when the following detailed description is read with reference to the accompanying drawings in which like characters represent like parts throughout the drawings, wherein.

Figure 1:
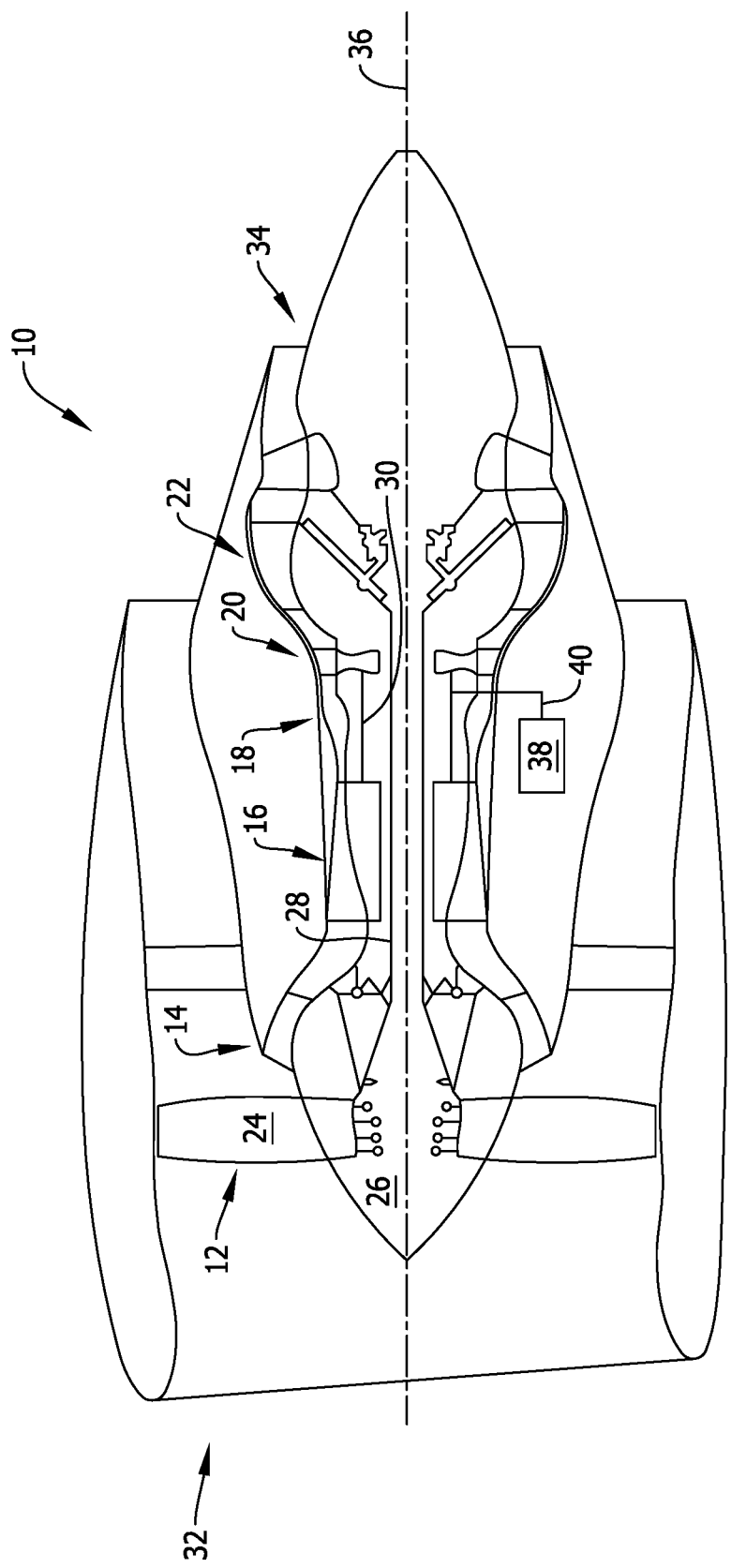
FIG. 1 is a schematic illustration of an exemplary turbine engine.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Embodiments of the present disclosure relate to systems and methods for use in mitigating thermal rotor bow in a turbine engine. More specifically, in one embodiment, feedback on one or more operating parameters of the turbine engine is used to determine a motoring time for the turbine engine that will result in sufficient thermal rotor bow mitigation for engine startup. For example, in one embodiment, the motoring time is selected from multiple preset motoring times that each correspond to a different value of the one or more operating parameters. The one or more parameters are monitored as the rotor assembly of the turbine engine is rotated for the selected motoring time, and feedback is further used to dynamically adjust the motoring time if a determination is made to implement additional or less rotor bow mitigation. As such, thermal rotor bow is mitigated in a timely and efficient manner.

In another embodiment, the systems and methods described herein facilitate controlling the rotational speed of the turbine engine during startup motoring thereof. The rotational speed of the turbine engine is controlled by selectively actuating variable stator vanes included within the turbine engine, by controlling the power output of a starter system coupled to the turbine engine, and by a combination thereof. Actuating the variable stator vanes into an at least partially open position during engine startup increases counter-rotational torque on the rotor assembly of the turbine engine, which facilitates reducing the rotational speed of the turbine engine. In one embodiment, the power output of the starter system is controlled with a series of valves that control airflow in the starter system, such as a modulating valve in an auxiliary power unit (APU) and a starter valve coupled between the APU and a starter motor. The valves facilitate adjusting the power output of the starter motor, and controlling multiple control valves enables different levels of adjustment of the power output to be provided. As such, the rotational speed of the turbine engine is controlled in a precise manner for reduction of the rotational speed to less than a resonant rotational speed, which may result in unwanted vibration and potential contact between rotating and stationary components in the turbine engine. Alternatively, controlling the rotational speed of the turbine engine enables incremental increases in the rotational speed of the turbine engine to be made as thermal rotor bow is progressively mitigated. As such, the motoring time of the turbine engine is reduced.

As used herein, "resonant rotational speed" refers to a single rotational speed or a range of rotational speeds of the turbine engine that causes high dynamic vibration or displacement in the presence of a rotor imbalance such as thermal rotor bow.

In many modern turbine engines, the control valve that controls airflow to the starter motor is also referred to as a starter air valve. The starter air valve is typically actuated by full authority digital engine control (FADEC) motoring logic that selectively actuates the starter air valve, and that determines if the starter air valve is in a closed position or an open position. In the event of a malfunction in the actuation of the starter air valve by the FADEC motoring logic, the starter air valve is accessible to ground personnel to facilitate manual actuation of the starter air valve and manual startup of the turbine engine. A power output of the starter motor can sometimes be modulated with additional FADEC motoring logic that selectively actuates the starter air valve into intermediate positions between the closed position and the open position. However, known FADEC motoring logic may generate a fault when the starter air valve is manually actuated into an open position, thereby preventing startup of the turbine engine.

Accordingly, another embodiment of the present disclosure relates to systems and methods for use in manually starting a turbine engine by bypassing normal FADEC pre-lightoff motoring logic. More specifically, the systems and methods described herein include a FADEC system having a primary startup procedure and a secondary startup procedure. The primary startup procedure includes logic for automatically adjusting a power output of a starter motor of the turbine engine. More specifically, the primary startup procedure includes logic for selectively actuating a starter air valve from a closed position into a fully open position, or an intermediate position defined therebetween based on a desired motoring speed of the turbine engine. In the event of a malfunction in automatically adjusting the power output of the starter motor, a fault is generated in the system and the primary startup procedure is unable to be executed. In such a scenario, during a subsequent start attempt, the FADEC system bypasses the primary startup procedure and executes a secondary startup procedure that does not include logic for selectively actuating the starter air valve. As such, the FADEC system includes logic that enables manual startup of the turbine engine, and that is compliant with parallel logic that automatically adjusts the motoring speed of the turbine engine.

While described in the context of a turbofan engine, it should be understood that the systems and methods described herein are also applicable to turboprop engines, turboshaft engines, turbojet engines, and any other turbine engine where thermal rotor bow mitigation is desired. Moreover, as will be described in more detail below, any of the embodiments described herein may be used, either alone or in combination, to facilitate controlling startup of a turbine engine.

FIG. 1 is a schematic illustration of an exemplary turbine engine 10, such as a turbofan engine. Turbine engine 10 includes a fan assembly 12, a low-pressure or booster compressor assembly 14, a high-pressure compressor assembly 16, and a combustor assembly 18. Fan assembly 12, booster compressor assembly 14, high-pressure compressor assembly 16, and combustor assembly 18 are coupled in flow communication. Turbine engine 10 also includes a high-pressure turbine 20 coupled in flow communication with combustor assembly 18 and a low-pressure turbine 22. Fan assembly 12 includes an array of fan blades 24 extending radially outward from a rotor disk 26. Low-pressure turbine 22 is coupled to fan assembly 12 and booster compressor assembly 14 through a first drive shaft 28, and high-pressure turbine 20 is coupled to high-pressure compressor assembly 16 through a second drive shaft 30. Turbine engine 10 has an intake 32 and an exhaust 34. Turbine engine 10 further includes a centerline 36 about which fan assembly 12, booster compressor assembly 14, high-pressure compressor assembly 16, and turbines 20 and 22 rotate.

Turbine engine 10 may also include a starter motor 38 and a starter shaft 40 coupled to the rotor assembly of turbine engine 10. More specifically, in one embodiment, starter shaft 40 is coupled to second drive shaft 30, and starter motor 38 provides motoring power to turbine engine 10 during startup thereof via starter shaft 40. In some embodiments, and as will be explained in further detail below, starter motor 38 is actuated by any suitable source of pneumatic airflow, such as an APU, another engine, or a static pressure tank. Alternatively, starter motor 38 is actuated by a power source other than pneumatic airflow, such as electricity.

In operation, a portion of air entering turbine engine 10 through intake 32 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled towards turbines 20 and 22. Combustion gas is subsequently discharged from turbine engine 10 via exhaust 34.

Figure 2:
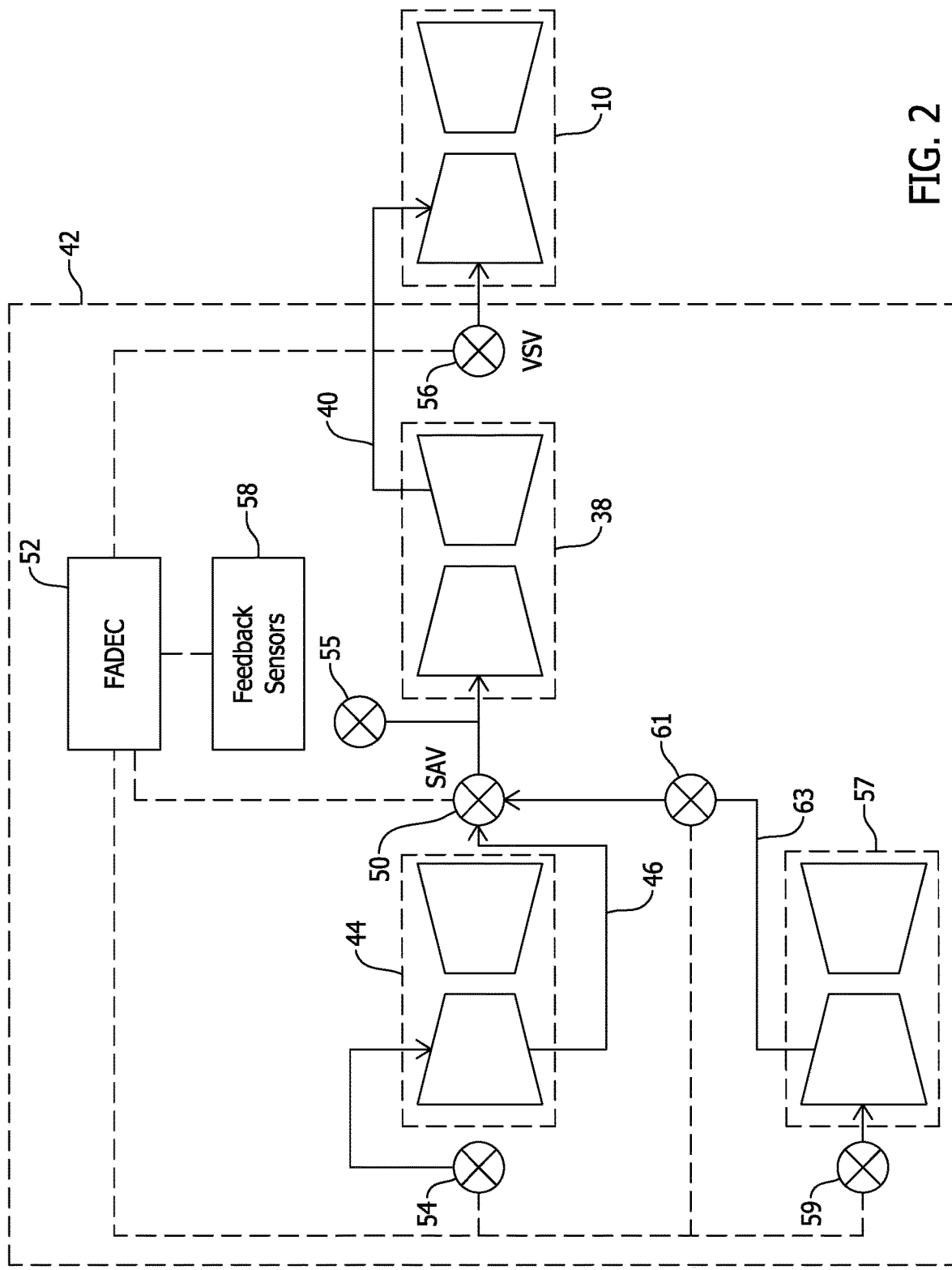
FIG. 2 is a schematic illustration of an exemplary starter system that may be used to actuate the turbine engine shown in FIG. 1.

FIG. 2 is a schematic illustration of an exemplary starter system 42 that may be used to actuate turbine engine 10. In the exemplary embodiment, starter system 42 includes starter motor 38 and an auxiliary power unit (APU) 44 coupled in a serial flow relationship. More specifically, APU 44 channels airflow towards starter motor 38 along a bleed line 46, and starter motor 38 converts the energy of the airflow to a mechanical output to facilitate actuating turbine engine 10. A control valve, such as a starter air valve (SAV) 50, is coupled along bleed line 46 to control airflow channeled from APU 44 towards starter motor 38. SAV 50 is either a two-position valve (i.e., a valve positionable between an open position and a closed position) or a multi-position valve (i.e., a valve positionable in a closed position, an open position, and at intermediate positions between the closed position and the open position). As such, in one embodiment, SAV 50 is selectively positioned in the open position, the closed position, or one of the intermediate positions to control the airflow channeled towards starter motor 38. Moreover, the position of SAV 50 may be dynamically adjusted during operation of starter motor 38 to control the motoring speed of turbine engine 10, as will be explained in more detail below.

In an alternative embodiment, starter motor 38 receives airflow from a pneumatic power source other than APU 44 such as, but not limited to, an already-started turbine engine or a static pressure tank located onboard a ground cart, for example. In addition, starter motor 38 may be actuated by a power source other than pneumatic airflow, such as electricity.

Starter system 42 further includes a computing device for controlling startup of turbine engine 10. In the exemplary embodiment, the computing device is onboard turbine engine 10, such as a full authority digital engine control (FADEC) system 52. FADEC system 52 is coupled, either by wired or wirelessly connectivity, in communication with one or more subsystems or components of turbine engine 10 and starter system 42 to control the operation of turbine engine 10 and starter system 42 at various stages of operation of turbine engine 10. For example, FADEC system 52 is coupled in communication with starter motor 38 and APU 44 for controlling the motoring time and the motoring speed of turbine engine 10. More specifically, FADEC system 52 is coupled in communication with SAV 50, a modulating valve 54 of APU 44, and variable stator vanes 56 of turbine engine 10 for controlling the motoring time and the motoring speed of turbine engine 10, as will be explained in more detail below. In an alternative embodiment, the subsystems or components of turbine engine 10 and starter system 42 are controlled by a computing device onboard an aircraft (not shown) in which turbine engine 10 is attached.

One or more feedback sensors 58 are also coupled in communication with FADEC system 52. Feedback sensors 58 and FADEC system 52 monitor one or more operating parameters of turbine engine 10. Depending on the operating parameters monitored, feedback sensors 58 also transmit feedback to FADEC system 52 for use in determining at least one of a motoring time or a motoring speed for turbine engine 10 that will result in thermal rotor bow mitigation. In an alternative embodiment, FADEC system 52 uses feedback from feedback sensors 58 to facilitate operating turbine engine 10 at a motoring speed less than a resonant rotational speed when mitigating thermal rotor bow, as will be described in more detail below. Example operating parameters of turbine engine 10 include, but are not limited to, a temperature within turbine engine 10, an ambient temperature outside turbine engine 10, a vibratory response of turbine engine 10 when rotated at a motoring speed, a dynamic or static clearance between rotating and stationary components of turbine engine 10, a rotational or motoring speed of turbine engine 10, and an amount of time since shutdown of turbine engine 10.

In operation, FADEC system 52 monitors at least one operating parameter of turbine engine 10, and determines a preset motoring time for turbine engine 10 based on a value of the at least one operating parameter. Determining how long to motor turbine engine 10 is balanced in consideration of how long it takes to mitigate thermal rotor bow and the desire to startup turbine engine 10 in a timely fashion. Moreover, more than one operating parameter may be used by FADEC system 52 to more accurately determine the preset motoring time. More than one operating parameter may also be monitored by FADEC system 52 such that FADEC system 52 is capable of determining a motoring time for turbine engine 10 in the event one or more feedback sensors 58 become inoperable, or in the event of another technical malfunction related to monitoring the operating parameters of turbine engine 10. Moreover, in some embodiments, the determined preset motoring time is zero based on the value of the at least one operating parameter.

For example, in one embodiment, FADEC system 52 determines the preset motoring time based on one or more temperature readings determined at the beginning of an engine startup cycle. Comparatively low temperatures within turbine engine 10 may indicate that turbine engine 10 has been shut down for a long period of time such that thermal rotor bow has been naturally mitigated. Low temperatures may also indicate that turbine engine 10 was previously turned on at a low power setting such that formation of thermal rotor bow is less severe. In contrast, comparatively high temperatures within turbine engine 10 may indicate that turbine engine 10 has been shut down for a period of time resulting in more severe formation of thermal rotor bow. As such, in some embodiments, the determined preset motoring time is shorter when the temperature within turbine engine 10 is comparatively low, and the determined preset motoring time is longer when the temperature within turbine engine 10 is comparatively high. In an alternative embodiment, FADEC system 52 determines the preset motoring time based on the amount of time since shutdown of turbine engine 10.

In addition to monitoring the temperature within turbine engine 10, in one embodiment, FADEC system 52 also monitors a temperature of an ambient environment outside turbine engine 10. FADEC system 52 determines a temperature difference (i.e., a thermal gradient) between the temperature within turbine engine 10 and the temperature of the ambient environment, and determines the preset motoring time based on a value of the temperature difference. A determination of the magnitude of a thermal gradient across turbine engine 10 provides a potentially more robust and accurate determination of the severity of thermal rotor bow formation.

In one embodiment, the preset motoring time is selected from a plurality of preset motoring times stored within FADEC system 52. For example, the preset motoring times may be in a format such as, but not limited to, an interpolated lookup table. The plurality of preset motoring times are predetermined based on the characteristics of the turbine engine controlled by FADEC system 52. Each preset motoring time of the plurality of preset motoring times corresponds to a different value of the at least one operating parameter. In addition, when the preset motoring time is determined based on multiple operating parameters, the value of each operating parameter may be given equal weight or weighted differently when determining the preset motoring time. In an alternative embodiment, FADEC system 52 calculates the preset motoring time at each startup cycle using an algorithm stored therein.

Once the preset motoring time is determined, FADEC system 52 actuates starter motor 38 such that turbine engine 10 is rotated at a motoring speed. In one embodiment, starter motor 38 is actuated for at least the preset motoring time. FADEC system 52 also continues to monitor one or more operating parameters of turbine engine 10 to determine whether to dynamically adjust the motoring time of turbine engine 10 after the preset motoring time has expired. For example, in the exemplary embodiment, FADEC system 52 and feedback sensors 58 monitor a vibratory response of turbine engine 10 as turbine engine 10 is rotated at the motoring speed for the preset motoring time, and FADEC system 52 adds additional time to the preset motoring time based on the value of the vibratory response. The value or severity of the vibratory response is generally indicative of the continued existence of thermal rotor bow when motoring turbine engine 10. For example, turbine engine 10 experiences a greater vibratory response at motoring speeds at or near the resonant rotational speed of turbine engine 10. As such, in the event actuation of starter motor 38 for the preset motoring time has insufficiently mitigated thermal rotor bow, FADEC system 52 increases the motoring time of turbine engine 10. In one embodiment, FADEC system 52 increases the motoring time when the value of the vibratory response is greater than a predetermined threshold at the conclusion of the preset motoring time. Alternatively, the motoring time of turbine engine 10 is reduced based on the vibratory response. Operating parameters other than vibratory response, as described above, may be monitored to determine whether to dynamically adjust the motoring time of turbine engine 10.

When the motoring time of turbine engine 10 is increased, FADEC system 52 also includes logic for shutting down starter motor 38 after starter motor 38 operates for a preset time, and firing turbine engine 10 even if the preset time has been reached. More specifically, the preset time is determined as a function of a theoretical maximum time to be implemented for mitigating a theoretical thermal rotor bow. The theoretical maximum time is based on a worst-case estimate of the magnitude of thermal rotor bow. If the theoretical maximum time has been reached and the vibratory response, for example, is still greater than the predetermined threshold, a malfunction may have occurred and turbine engine 10 is started. As such, the motoring time of turbine engine 10 can only be increased up to the preset time, which reduces unnecessary wear to starter motor 38.

As described above, motoring turbine engine 10 progressively decreases the severity of thermal rotor bow as a function of time. In general, thermal rotor bow is more rapidly mitigated at higher motoring speed. In one embodiment, lessening the severity of thermal rotor bow enables incremental increases to the motoring speed of turbine engine 10 to be made, such that overall motoring time of turbine engine 10 is reduced. As such, FADEC system 52 also monitors the vibratory response of turbine engine 10 to determine when the motoring speed of turbine engine 10 can be modified. More specifically, FADEC system 52 monitors turbine engine 10 for an adjustment in the value of the vibratory response as turbine engine 10 is rotated at the motoring speed, and increases the motoring speed of turbine engine 10 when the vibratory response decreases.

FADEC system 52 modifies the motoring speed of turbine engine 10 using one or more control arrangements, utilized separately or in combination with each other. For example, FADEC system 52 selectively actuates at least one valve in starter system 42 and/or variable stator vanes 56 in turbine engine 10 to control the motoring speed of turbine engine 10. In some embodiments, the control arrangements increase the motoring speed of turbine engine 10 to reduce motoring time or, in the alternative, reduce the motoring speed of turbine engine 10 to facilitate motoring turbine engine 10 at a motoring speed less than the resonant rotational speed.

In one embodiment, referring to FIG. 2, FADEC system 52 is coupled in communication with SAV 50 and modulating valve 54 for controlling actuation thereof. Controlling actuation of SAV 50 and modulating valve 54 enables the motoring speed of turbine engine 10 to be controlled in a more precise and responsive manner, with redundancy, when compared to a single valve actuation control arrangement. For example, controlling motoring speed of turbine engine 10 with only modulating valve 54 may result in communication latency and physical lag due to an increased flowpath distance between modulating valve 54 and starter motor 38, when compared to the flowpath distance between SAV 50 and starter motor 38.

In operation, FADEC system 52 actuates and holds modulating valve 54 at a predetermined position such that APU 44 provides a predetermined power output to starter motor 38. The predetermined power output is selected such that, if SAV 50 were in a fully open position, the motoring speed of turbine engine 10 would be slightly greater than the resonant rotational speed. As such, FADEC system 52 adjusts a position of SAV 50 to control the motoring speed of turbine engine 10. More specifically, FADEC system 52 actuates SAV 50 into an at least partially closed position to reduce the motoring speed of turbine engine 10 below the resonant rotational speed. FADEC system 52 also dynamically adjusts the position of SAV 50 based on the vibratory response of turbine engine 10, for example, to increase or decrease the motoring speed of turbine engine 10.

In an alternative embodiment, the amount of power provided to starter motor 38 from APU 44 is adjusted to control the motoring speed of turbine engine 10. In one embodiment, as described above, the position of modulating valve 54 is adjusted to control the motoring speed. In addition or in the alternative, the position of inlet guide vanes or compressor stator vanes within APU 44 may be adjusted, the position of an output modulating valve positioned between APU 44 and starter motor 38 may be adjusted, an accessory load may be pulled from APU 44, and/or fuel flow provided to APU 44 may be adjusted to control the motoring speed.

Moreover, in one embodiment, the motoring speed of turbine engine 10 is controlled by actuating valves other than, or in addition to, SAV 50 and modulating valve 54. The additional valves other than SAV 50 and modulating valve 54 control airflow channeled towards starter motor 38 when a source of pneumatic power other than APU 44 is used to actuate starter motor 38. For example, starter motor 38 may be actuated by a power source other than APU 44. In such an embodiment, when feasible, FADEC system 52 controls a power output of the power source such that the predetermined power output is provided to starter motor 38. For example, when cross-bleeding from an already-started turbine engine 57, FADEC system 52 may control actuation of a bleed valve 59 within already-started turbine engine 57, or a control valve 61 coupled along a bleed line 63 extending between already-started turbine engine 57 and starter motor 38, to control the motoring speed of turbine engine 10. A further additional valve for controlling the motoring speed of turbine engine 10 includes discharge or bypass valve 55, which is selectively actuatable to reduce an amount of airflow channeled into starter motor 38.

Actuation of SAV 50, modulating valve 54, additional valves described above, or a combination thereof, may be used additionally with actuation of variable stator vanes 56 to increase or decrease the motoring speed of turbine engine 10. Alternatively, when starter motor 38 is actuated by electricity, FADEC system 52 controls the power output of the electric motor to control the motoring speed of turbine engine 10.

Figure 3:
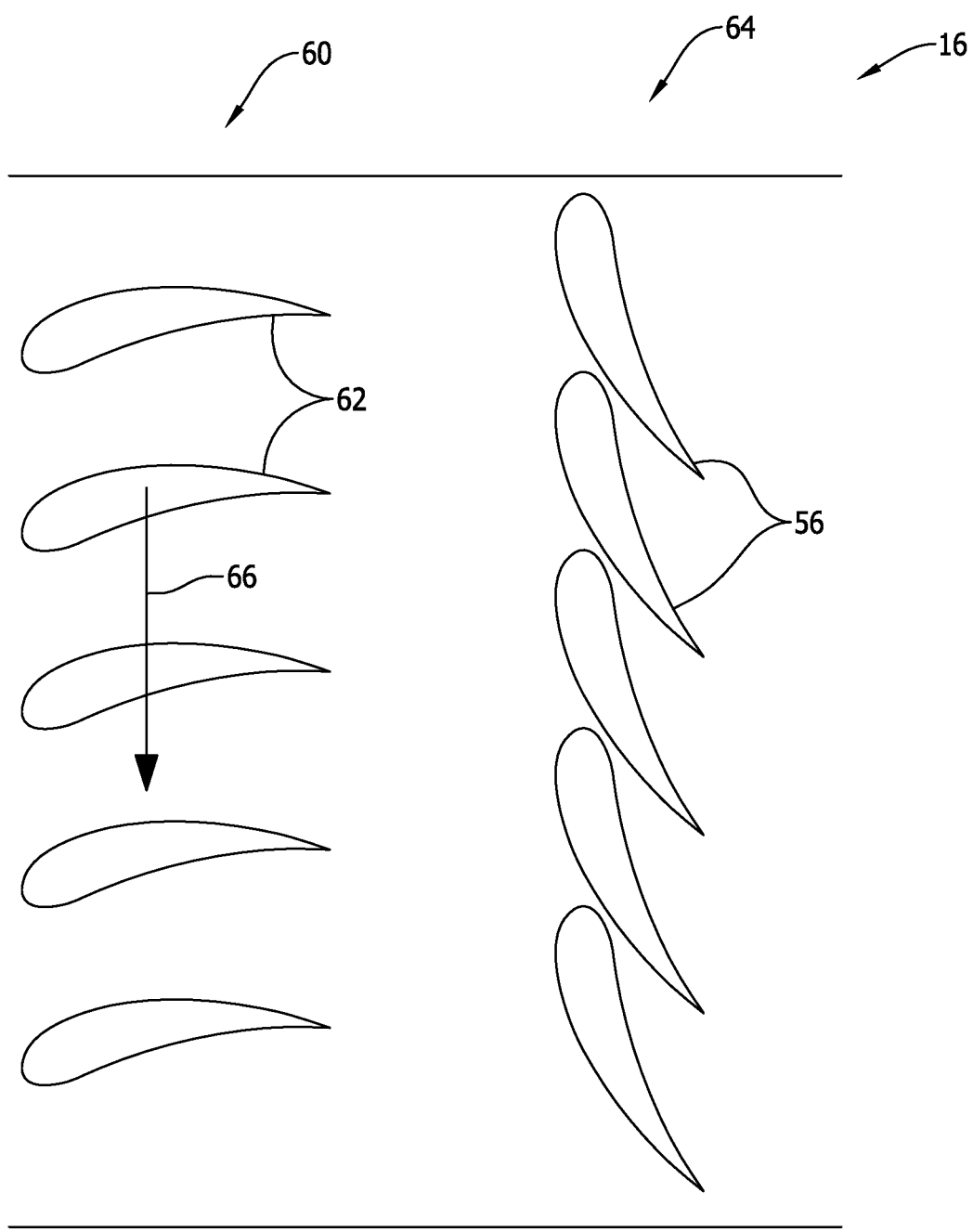
FIG. 3 is a radial illustration of a portion of a compressor assembly that may be used in the turbine engine shown in FIG. 1, wherein the compressor assembly is in a first operational position.
Figure 4:
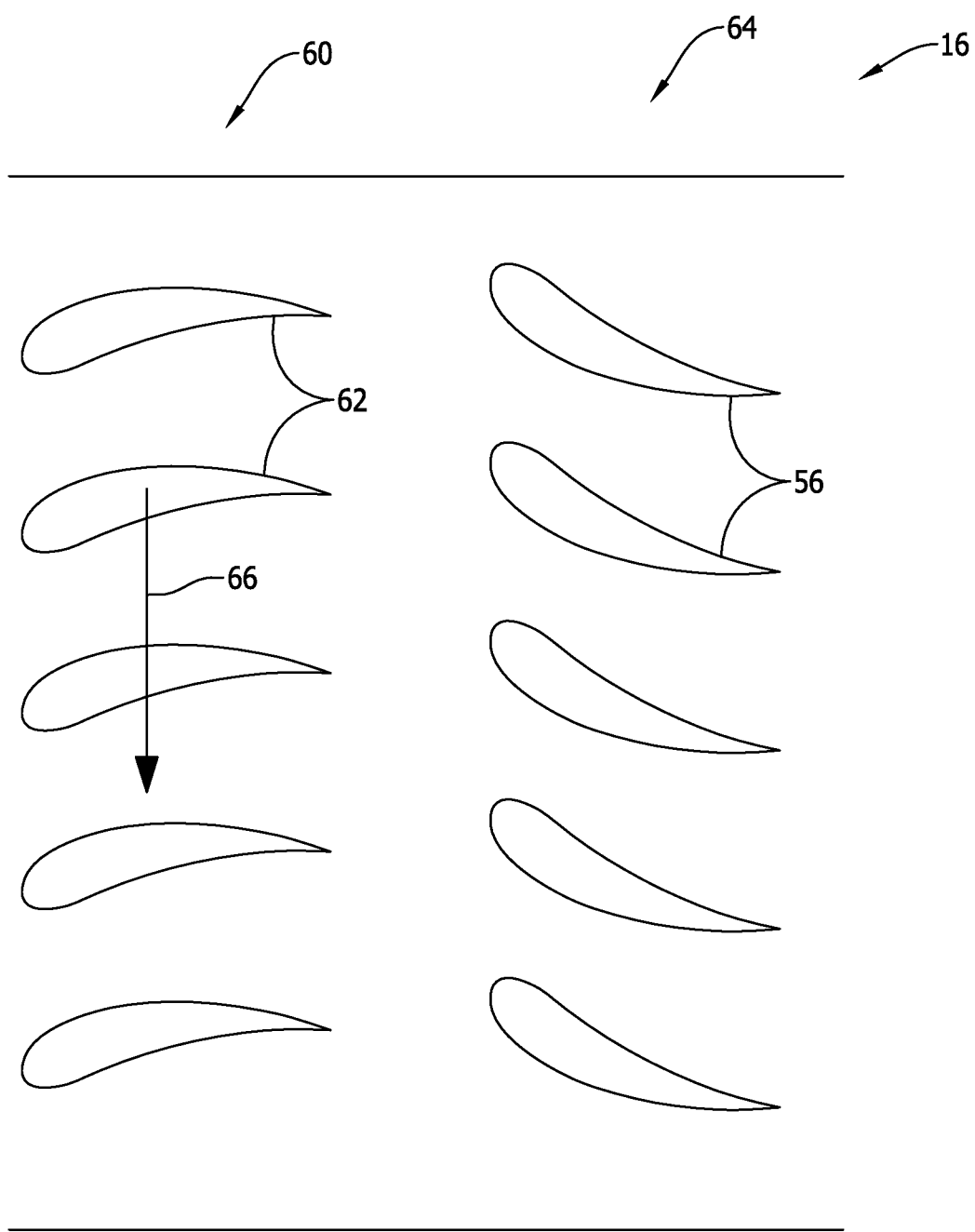
FIG. 4 is a radial illustration of the portion of the compressor assembly shown in FIG. 3 in a second operational position.

FIG. 3 is a radial illustration of a portion of a compressor assembly, such as high-pressure compressor assembly 16, that may be used in turbine engine 10 (shown in FIG. 1), wherein high-pressure compressor assembly 16 is in a first operational position (i.e., a closed position), and FIG. 4 is a radial illustration of the portion of high-pressure compressor assembly 16 in a second operational position (i.e., an at least partially open position). As described above, FADEC control of variable stator vanes 56 is one of many control arrangements for controlling the motoring speed of turbine engine 10. In the exemplary embodiment, high-pressure compressor assembly 16 includes at least one row 60 of a plurality of rotor blades 62, and at least one row 64 of a plurality of variable stator vanes 56 positioned downstream from row 60. The plurality of rotor blades 62 rotate in a circumferential direction 66 relative to centerline 36 (shown in FIG. 1), and the plurality of variable stator vanes 56 remain substantially stationary (i.e., non-rotating in circumferential direction 66) relative to the rotation of the plurality of rotor blades 62. In an alternative embodiment, row 64 is positioned upstream from row 60.

The plurality of variable stator vanes 56 are selectively actuatable, either individually or together, between a closed position and an at least partially open position. More specifically, the plurality of variable stator vanes 56 are rotatable about a radial axis (not shown) that extends radially relative to centerline 36. Opening the plurality of variable stator vanes 56 increases counter-rotational torque on the rotor assembly of turbine engine 10, which reduces the motoring or rotational speed of turbine engine 10. In contrast, closing the plurality of variable stator vanes 56 reduces counter-rotational torque on the rotor assembly of turbine engine 10, which increases the motoring or rotational speed of turbine engine 10. In some embodiments, the plurality of variable stator vanes 56 are positionable at intermediate positions between the closed position and a fully open position. Moreover, the closed position of variable stator vanes 56 is generally defined by the size of a clearance between adjacent variable stator vanes 56 in row 64 (i.e., variable stator vanes 56 are closed when the clearance can no longer be reduced when rotating vanes 56 about the radial axis).

As described above, FADEC system 52 (shown in FIG. 1) is coupled, either by wired or wirelessly connectivity, in communication with the plurality of variable stator vanes 56. More specifically, FADEC system 52 is capable of selectively and dynamically positioning the plurality of variable stator vanes 56 in the closed position, the open position, or various intermediate positions in response to fluctuations in the motoring speed of turbine engine 10, or based on a desired motoring speed of turbine engine 10. In an alternative embodiment, FADEC system 52 selectively actuates inlet guide vanes (not shown) of high-pressure compressor assembly 16, or inlet guide vanes of booster compressor assembly 14 to control the motoring speed of turbine engine 10.

In one embodiment, prior to startup of turbine engine 10, variable stator vanes 56 are in the closed position. During startup, FADEC system 52 actuates starter motor 38 (shown in FIG. 1) of turbine engine 10 such that a rotational speed of turbine engine 10 is increased. Starter motor 38 is sometimes actuated at a power output such that turbine engine 10 is potentially rotated at a motoring speed greater than the resonant rotational speed when variable stator vanes 56 are in the closed position. FADEC system 52 actuates the plurality of variable stator vanes 56 into an at least partially open position to reduce the motoring speed of turbine engine 10. More specifically, FADEC system 52 adjusts the position of the plurality of variable stator vanes 56 from the closed position into an at least partially open position such that the motoring speed of turbine engine 10 is reduced. Alternatively, as described above, other control arrangements, such as single or multiple valve actuations via FADEC control, can be used alone, or in combination with actuation of variable stator vanes 56, to reduce the motoring speed of turbine engine 10.

The motoring speed implemented by FADEC control of variable stator vanes 56 is determined as a function of the desire for timely mitigation of thermal rotor bow and the desire to reduce contact-related wear in turbine engine 10. As such, in one embodiment, the position of variable stator vanes 56 is adjusted such that the motoring speed is greater than a predetermined motoring speed and less than the resonant rotational speed. For example, the predetermined motoring speed is determined based on the resonant rotational speed, and is set to a maximum value relative to the resonant rotational speed that will not cause unacceptable levels of vibration and engine component damage in the presence of thermal rotor bow.

As described above, motoring turbine engine 10 decreases the severity of thermal rotor bow as a function of time, which enables incremental increases to the motoring speed of turbine engine 10 to be made. For example, the motoring speed may be increased to a maximum value that will not cause unacceptable levels of vibration and engine component damage in the presence of thermal rotor bow. As such, FADEC system 52 adjusts the positions of one or more valves (e.g., valves 50, 54, 55, 59, and 61) and/or the position of the plurality of variable stator vanes 56 such that the motoring speed of turbine engine 10 is as close to the maximum value as possible to increase the cooling efficiency and mitigating effects of motoring turbine engine 10. In one embodiment, FADEC system 52 monitors the vibratory response of turbine engine 10 to determine how much and when the motoring speed of turbine engine 10 can be increased. When increasing the motoring speed of turbine engine 10, FADEC system 52 closes variable stator vanes 56 to reduce counter-rotational torque on turbine engine 10. As such, motoring time of turbine engine 10 is reduced. FADEC system 52 may also monitor other operating parameters, as described above, to determine how much and when the motoring speed of turbine engine 10 can be increased.

In an alternative embodiment, FADEC system 52 monitors a vibratory response of turbine engine 10, and adjusts the position of the plurality of variable stator vanes 56 such that the vibratory response is less than a predetermined threshold.

Figure 5:
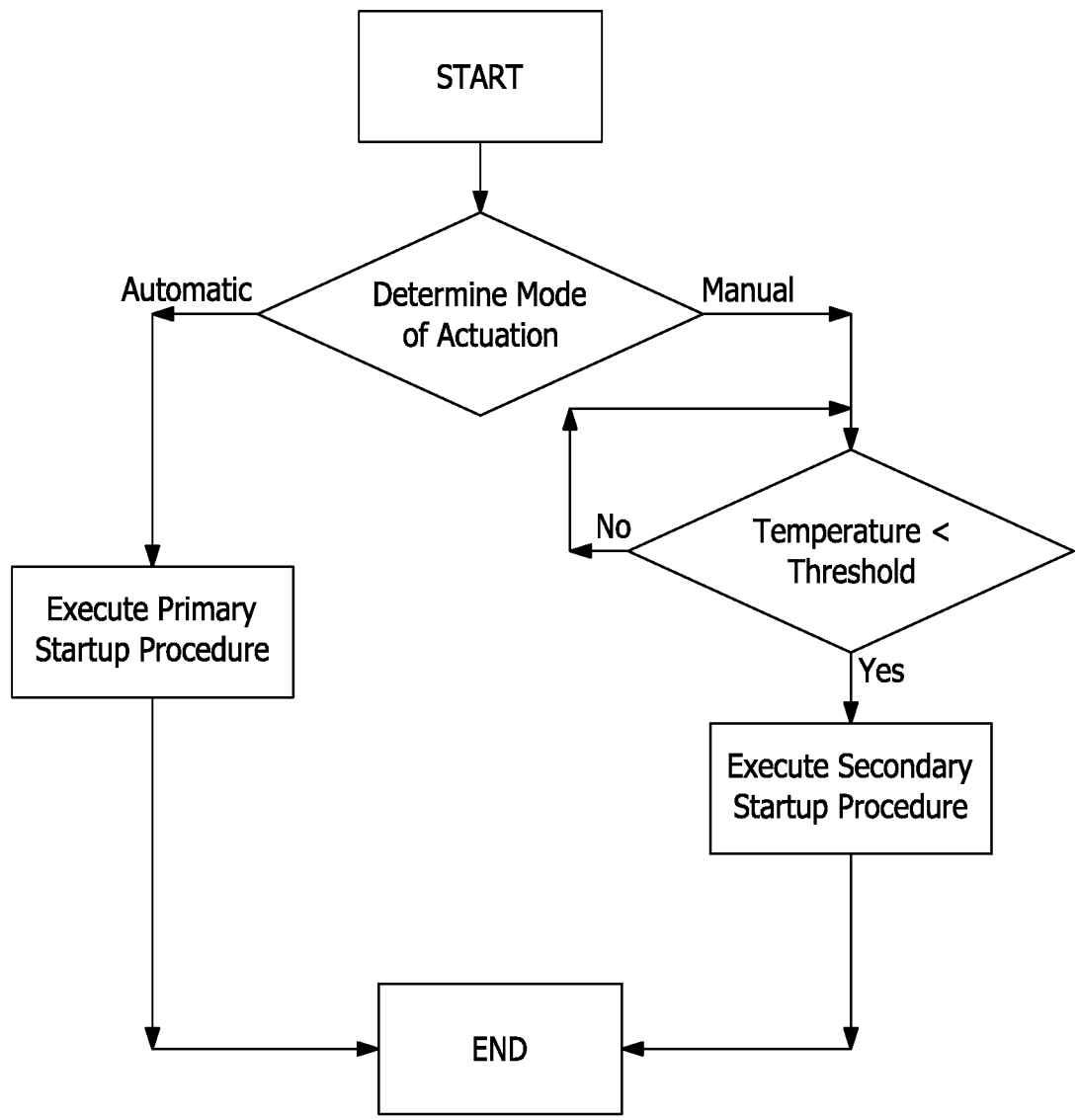
FIG. 5 is a logic diagram illustrating an exemplary method of operating the turbine engine shown in FIG. 1.
Figure 6:
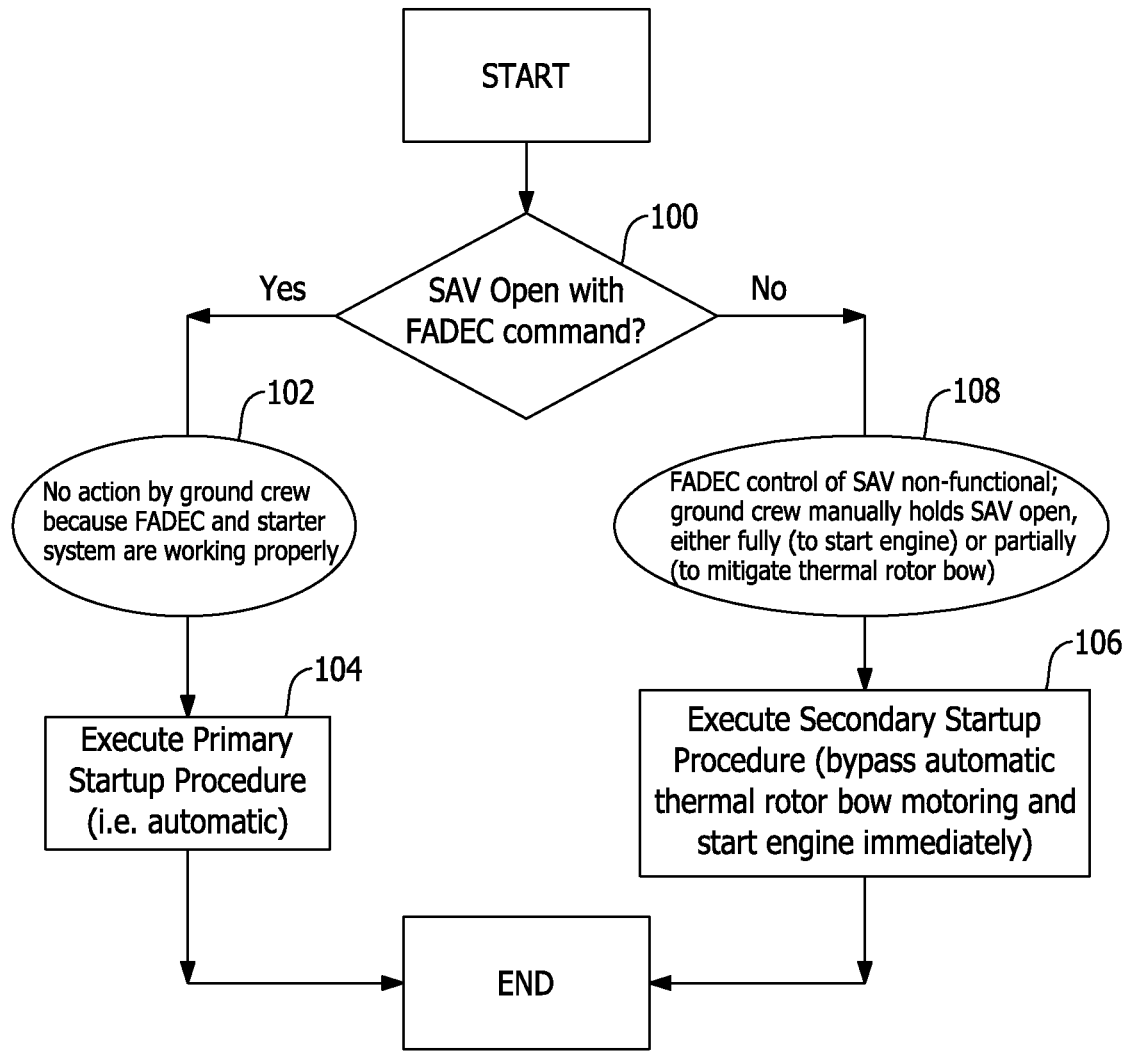
FIG. 6 is a logic diagram illustrating an exemplary method of determining a startup procedure to execute.
Figure 7:
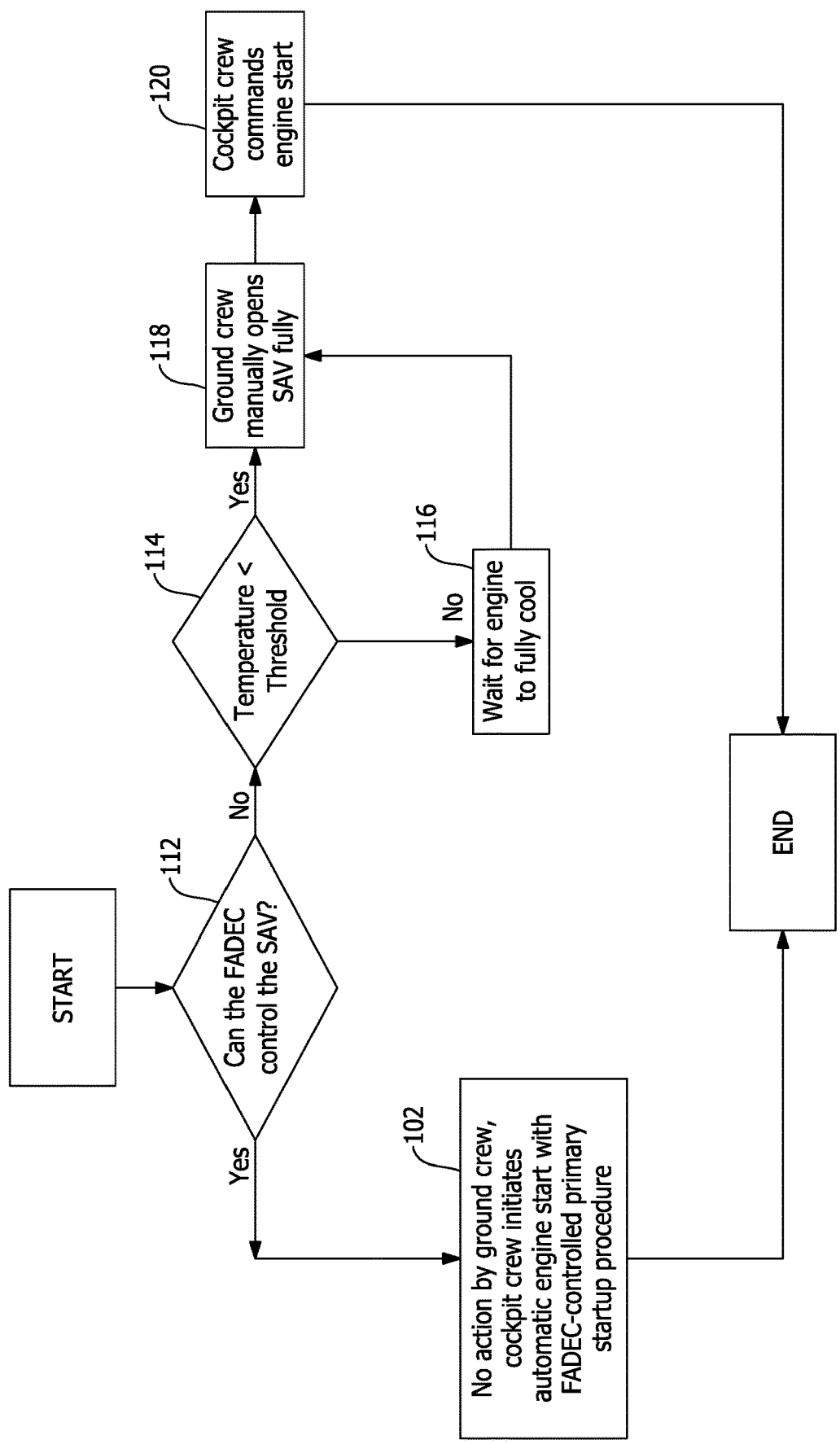
FIG. 7 is a logic diagram illustrating an exemplary method of manually starting the turbine engine shown in FIG. 1.
Figure 8:
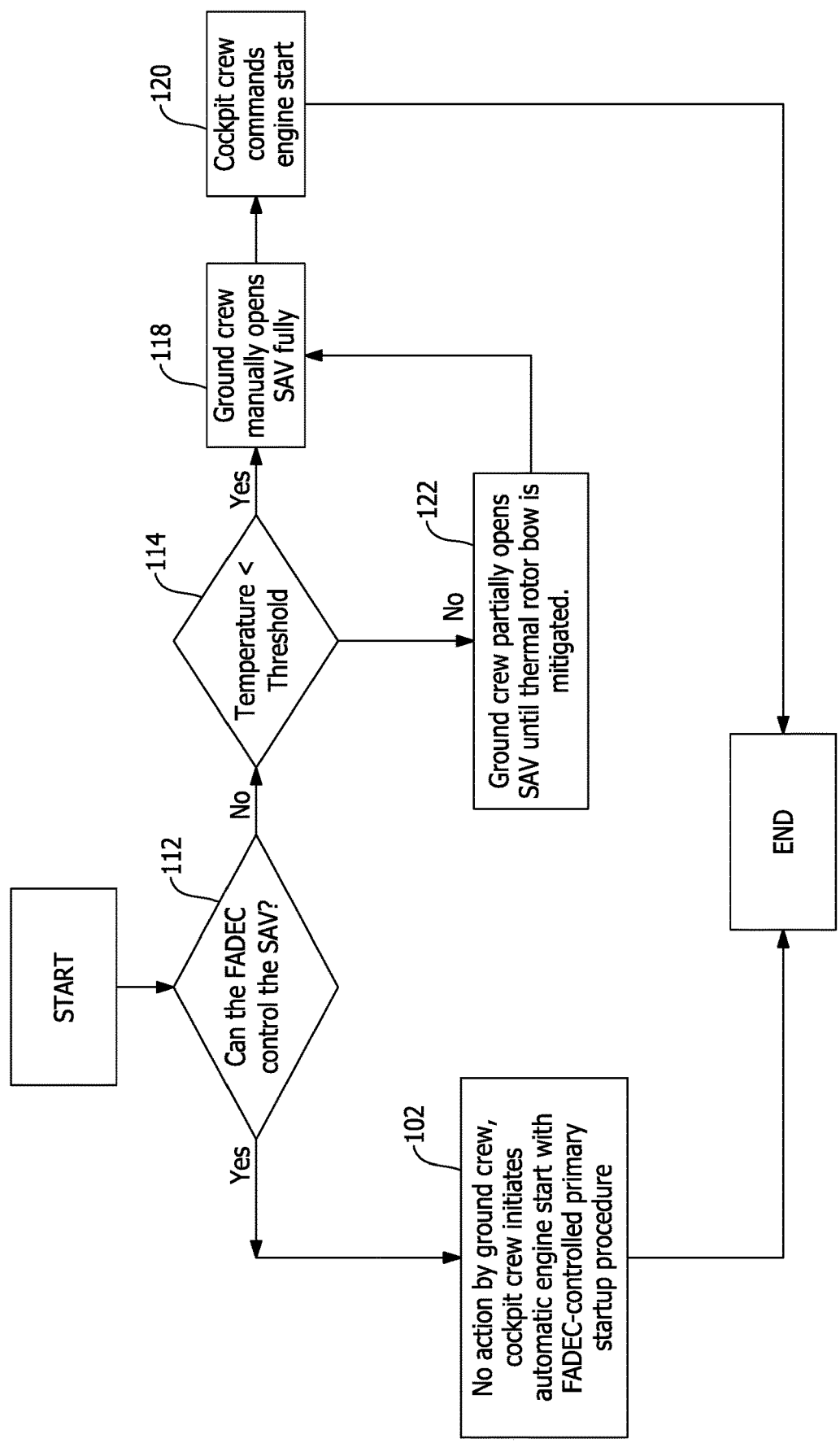
FIG. 8 is a logic diagram illustrating an alternative method of manually starting the turbine engine shown in FIG. 1.

FIGS. 5-8 are logic diagrams illustrating exemplary methods of operating turbine engine 10 (shown in FIG. 1). More specifically, FIGS. 5, 7, and 8 illustrate crew logic for starting turbine engine 10, and FIG. 6 illustrates FADEC logic for starting turbine engine 10. As described above, the formation of thermal rotor bow in first drive shaft 28 and second drive shaft 30 (each shown in FIG. 1), for example, can occur after shutdown of turbine engine 10 and before turbine engine 10 has fully cooled. The primary startup procedure includes logic for mitigating thermal rotor bow prior to engaging combustor assembly 18 (shown in FIG. 1), and for adjusting the power output of starter motor 38 (shown in FIG. 1). While described in the context of SAV 50, the logic described herein may also be applied when attempting manual start of turbine engine 10 by manually opening valves 54, 59, and 61 (each shown in FIG. 2), for example.

Referring to FIGS. 5 and 6, in operation, a cockpit crew attempts startup of turbine engine 10 in which FADEC system 52 (shown in FIG. 2) executes the primary startup procedure. As described above, the primary startup procedure includes an automatic mode of actuation of SAV 50 (shown in FIG. 1). In one embodiment, FADEC system 52 determines the mode of actuation of SAV 50 (shown at box 100). For example, FADEC system 52 determines SAV 50 was opened with the automatic mode of actuation based on whether SAV 50 was opened with FADEC command, and the non-existence of a malfunction when FADEC system 52 attempts to selectively actuate SAV 50. When SAV 50 is opened with FADEC command, the ground crew does not need to manually open SAV 50 (shown at box 102) and the primary startup procedure is executed (shown at box 104).

If the primary startup procedure fails to start turbine engine 10, such as when SAV 50 fails to open via FADEC command, a first fault is triggered and the cockpit crew terminates the startup procedure. SAV 50 is then manually opened, and the cockpit crew restarts the startup procedure. Manually opening SAV 50 triggers a second fault in FADEC system 52, which causes the primary startup procedure to be bypassed. For example, upon receiving the startup command, FADEC system 52 determines the mode of actuation of SAV 50 from the closed position to the at least partially open position, and executes the secondary startup procedure (shown at box 106) when FADEC control of SAV 50 is non-functional (shown at box 108) and it is determined that SAV 50 has been opened manually. As such, the primary startup procedure is bypassed, which causes the secondary startup procedure to be executed. In an alternative embodiment, FADEC system 52 receives feedback on the physical position of SAV 50.

As described above, FADEC system 52 determines SAV 50 was opened with the manual mode of actuation based on the existence of at least one malfunction in the automatic mode of actuation. The malfunction is defined by a failure of the control logic in FADEC system 52 in selectively actuating SAV 50 between the closed position and the at least partially open position. For example, the malfunction can be at least one of a mechanical failure at SAV 50, an electrical failure, and communications failure between FADEC system 52 and SAV 50. If the mode of actuation is not the automatic mode of actuation (i.e., the mode of actuation is the manual mode of actuation), FADEC system 52 executes the secondary startup procedure. The secondary startup procedure does not include logic for mitigating thermal rotor bow prior to engaging combustor assembly 18, and does not include logic for adjusting the power output of starter motor 38 such that a fault is not generated when FADEC system 52 determines there is a failure in the control logic for actuating SAV 50. Rather, the secondary startup procedure assumes that pneumatic power is provided to starter motor 38, regardless of the ability of FADEC system 52 to control SAV 50, due to SAV 50 being opened manually.

In one embodiment, FADEC system 52 receives feedback on a temperature within turbine engine 10, and executes the secondary startup procedure only if the temperature is less than a predetermined threshold (shown at box 110). FADEC system 52 executes the secondary startup procedure only if the temperature is less than the predetermined threshold such that thermal rotor bow has either decreased, or has been entirely mitigated prior to engine startup. Alternatively, any feedback may be used to determine when the secondary startup procedure may be executed (i.e., when turbine engine 10 can be motored at full power without causing a potentially harmful vibratory response). For example, alternative feedback includes an amount of time that has passed since shutdown of turbine engine 10.

Referring to FIG. 7, a crew logic diagram for starting turbine engine 10 with SAV 50 that can only be fully opened is shown. As shown, the cockpit crew determines if FADEC system 52 has control over SAV 50 (shown at box 112). If not, the cockpit crew determines if the engine temperature is less than a predetermined threshold (shown at box 114). The lack of logic in the secondary startup procedure for actuating SAV 50 results in uncontrolled motoring of turbine engine 10 (shown in FIG. 1), and turbine engine 10 is allowed to cool (shown at box 116) such that the uncontrolled motoring does not result in forming a potentially harmful vibratory response in turbine engine 10. Alternatively, other operating parameters of turbine engine 10, such as time since engine shutdown, are, used to determine when uncontrolled motoring of turbine engine 10 may be implemented. Once turbine engine 10 has cooled, SAV 50 is fully opened (shown at box 118) and a command to start the engine is executed (shown at box 120).

Referring to FIG. 8, and as described above, SAV 50 is capable of being opened manually into an intermediate position between the closed position and the open position to facilitate mitigating thermal rotor bow. Opening SAV 50 into the intermediate position (shown at box 122) causes turbine engine 10 to reach a motoring speed that is high enough to mitigate the thermal rotor bow but low enough to avoid creating a vibratory response and potentially damaging turbine engine 10. As such, in the manual mode of actuation, the thermal rotor bow is mitigated manually prior to fully opening SAV 50 (shown at box 118). Turbine engine 10 then receives a command from the cockpit (shown at box 120), for example, which causes turbine engine 10 to start. As such, turbine engine 10 can be started without waiting for turbine engine 10 to fully cool.

Any suitable indication that thermal rotor bow has been mitigated may be provided to personnel within the cockpit that enables the systems and methods to function as described herein. For example, in one embodiment, SAV 50 is manually opened and held in the intermediate position for a predetermined amount of time, and the cockpit command to start turbine engine 10 is provided after the predetermined amount of time has run. Alternatively, FADEC system 52 monitors the motoring progress of turbine engine 10 (e.g., motoring speed and time, engine internal temperature, and vibration levels), and provides an indication to the cockpit that the rotor bow has been mitigated. This logic may be embodied in FADEC system 52, an aircraft, or any other suitable computer system.

In embodiments where FADEC system 52 does not have control over SAV 50, the motoring speed of turbine engine 10 can be controlled using any of the control arrangements described above. For example, uncontrolled motoring of turbine engine 10 can result in motoring speeds greater than the resonant rotational speed. As such, FADEC system 52 controls actuation of modulating valve 54, actuation of any combination of the additional valves, such as discharge or bypass valves 55, in starter system 42, actuation of variable stator vanes 56, or the power output of alternative actuating power sources for starter motor 38 for reducing the motoring speed of turbine engine 10.

Moreover, FADEC system 52 monitors at least one operating parameter of turbine engine 10 to determine how much and when the motoring speed of turbine engine 10 can be increased. More specifically, FADEC system 52 monitors an operating parameter of turbine engine 10, such as the vibratory response of turbine engine 10, as turbine engine 10 is rotated at the initial motoring speed, and increases the motoring speed of turbine engine 10 when the vibratory response decreases. For example, the motoring speed of turbine engine 10 is increased by controlling actuation of modulating valve 54, actuation of any combination of the additional valves in starter system 42, actuation of variable stator vanes 56, or the power output of alternative actuating power sources for starter motor 38. As such, the motoring time of turbine engine 10 is reduced.

A method of operating a turbine engine is also described herein. The method includes monitoring at least one operating parameter of the turbine engine, determining a preset motoring time for the turbine engine based on a value of the at least one operating parameter, and actuating a starter motor of the turbine engine such that the turbine engine is rotated at a motoring speed, the starter motor actuated for at least the preset motoring time.

Determining a preset motoring time includes selecting the preset motoring time from a plurality of preset motoring times, each preset motoring time of the plurality of preset motoring times corresponding to a different value of the at least one operating parameter. Determining a preset motoring time further includes determining the preset motoring time based at least partially on a temperature within the turbine engine. Determining a preset motoring time further includes monitoring a temperature of an ambient environment outside the turbine engine, determining a temperature difference between the temperature within the turbine engine and the temperature of the ambient environment, and determining the preset motoring time based on a value of the temperature difference.

Monitoring at least one operating parameter of the turbine engine includes monitoring a vibratory response of the turbine engine as the turbine engine is rotated at the motoring speed. The method further includes adding additional time to the preset motoring time based on a value of the vibratory response. The method further includes monitoring the at least one operating parameter for an adjustment in a value of vibratory response as the turbine engine is rotated at the motoring speed, and increasing the motoring speed of the turbine engine when the vibratory response decreases.

The method further includes shutting down the starter motor such that the starter motor is actuated for an amount of time less than or equal to a predetermined duration. The method further includes actuating a plurality of variable stator vanes of the turbine engine such that the plurality of variable stator vanes are at least partially open to control the motoring speed of the turbine engine. The method further includes controlling a power output of a power source configured to actuate the starter motor of the turbine engine, wherein the power output is selected such that a predetermined power output is provided to the starter motor, and adjusting a position of a valve coupled between the power source and the starter motor, the position of the valve adjusted to control the motoring speed of the turbine engine.

A starter system for use with a turbine engine is also described herein. The starter system includes a starter motor and a computing device coupled in communication with the starter motor. The computing device is configured to monitor at least one operating parameter of the turbine engine, determine a preset motoring time for the turbine engine based on a value of the at least one operating parameter, and actuate the starter motor such that the turbine engine is rotated at a motoring speed, the starter motor actuated for at least the preset motoring time.

The starter system further includes at least one feedback sensor coupled in communication with the computing device. The at least one feedback sensor is configured to monitor the at least one operating parameter of the turbine engine, and to transmit feedback to the computing device. The at least one feedback sensor is further configured to monitor a temperature within the turbine engine, and the computing device is further configured to determine the preset motoring time based at least partially on the temperature within the turbine engine. The at least one feedback sensor is further configured to monitor a vibratory response of the turbine engine when rotated at the motoring speed, and the computing device is further configured to modify the preset motoring time based on a value of the vibratory response.

The computing device is further configured to shut down the starter motor such that the starter motor is actuated for an amount of time less than or equal to a predetermined duration.

A computer-readable medium having computer-executable instructions embodied thereon for use in operating a turbine engine is also described herein. When executed by at least one processor, the computer-executable instructions cause the processor to monitor at least one operating parameter of the turbine engine, determine a preset motoring time for the turbine engine based on a value of the at least one operating parameter, and actuate a starter motor of the turbine engine such that the turbine engine is rotated at a motoring speed, the starter motor actuated for at least the preset motoring time.

The computer-executable instructions further cause the processor to select the preset motoring time from a plurality of preset motoring times, each preset motoring time of the plurality of preset motoring times corresponding to a different value of the at least one operating parameter. The computer-executable instructions further cause the processor to determine the preset motoring time based at least partially on a temperature within the turbine engine. The computer-executable instructions further cause the processor to monitor a vibratory response of the turbine engine as the turbine engine is rotated at the motoring speed, and modify the preset motoring time based on a value of the vibratory response. The computer-executable instructions further cause the processor to shut down the starter motor such that the starter motor is actuated for an amount of time less than or equal to a predetermined duration.

A method of operating a turbine engine is also described herein. The method includes actuating a starter motor of the turbine engine such that the turbine engine is rotated at a motoring speed, monitoring at least one operating parameter of the turbine engine, and determining a motoring time for the turbine engine based on a value of the at least one operating parameter, the starter motor actuated for at least the motoring time.

Monitoring at least one operating parameter includes monitoring at least one of a temperature within the turbine engine or a vibratory response of the turbine engine. The method further includes adjusting the motoring time as a function of an adjustment in the value of the at least one operating parameter as the turbine engine is rotated at the motoring speed. The method further includes determining a motoring speed for the turbine engine based on the value of the at least one operating parameter. The method further includes adjusting the motoring speed as a function of an adjustment in the value of the at least one operating parameter as the turbine engine is rotated at the motoring speed.

A method of operating a turbine engine is also described herein. The method includes providing a primary startup procedure and a secondary startup procedure for the turbine engine and determining a mode of actuation of a starter air valve from a closed position to an at least partially open position. The starter air valve is configured control airflow channeled towards a starter motor of the turbine engine, wherein the primary startup procedure includes an automatic mode of actuation of the starter air valve. The method also includes executing the secondary startup procedure if the mode of actuation is not the automatic mode of actuation.

A turbine engine is also described herein. The turbine engine includes a starter motor and a starter air valve configured to control airflow channeled towards the starter motor. The starter air valve is selectively actuatable between a closed position and an open position. The turbine engine also includes a computing device coupled in communication with the starter air valve. The computing device includes a primary startup procedure and a secondary startup procedure for the turbine engine stored thereon. The computing device is configured to determine a mode of actuation of the starter air valve from the closed position to an at least partially open position, wherein the primary startup procedure includes an automatic mode of actuation of the starter air valve. The computing device is also configured to execute the secondary startup procedure if the mode of actuation is not the automatic mode of actuation.

A computer-readable medium having computer-executable instructions embodied thereon for use in operating a turbine engine is also described herein. The computer-executable instructions include a primary startup procedure and a secondary startup procedure for the turbine engine, wherein, when executed by at least one processor, the computer-executable instructions cause the processor to determine a mode of actuation of a starter air valve of the turbine engine from a closed position to an at least partially open position. The primary startup procedure includes an automatic mode of actuation of the starter air valve. The computer-executable instructions also cause the processor to execute the secondary startup procedure if the mode of actuation is not the automatic mode of actuation.

An exemplary technical effect of the system and methods described herein includes at least one of: (a) actively controlling the rotational speed of a turbine engine during startup with existing internal engine controls; (b) facilitate controlling the rotational speed of the turbine engine below a resonant rotational speed; (c) reducing contact-related wear between rotating and stationary components of the turbine engine caused as a result of thermal rotor bow; (d) enabling a starter system to be operated normally (i.e., at full torque) while still controlling the motoring speed of the turbine engine during startup; (e) reducing startup time for the turbine engine; (f) enabling manual startup of a turbine engine; and (g) bypassing a primary startup procedure for a secondary startup procedure that enables the manual startup.

Exemplary embodiments of a turbine engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbine engines and related methods as described herein. Rather, the exemplary embodiment can be implemented and utilized in connection with many applications where improving or preserving turbine engine performance is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit any way the definition and/or meaning of the term processor.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of mitigating thermal rotor bow in a turbine engine, said method comprising:
    operating the turbine engine under normal operating conditions;
    shutting down the turbine engine, wherein thermal rotor bow occurs;
    monitoring at least one parameter indicative of the rotor bow of the turbine engine;
    in response to the at least one parameter, using a controller to:
        actuate a starter motor of the turbine engine to cause a rotor assembly of the turbine engine to rotate; and
        actuate a plurality of variable stator vanes of the turbine engine such that the plurality of variable stator vanes are at least partially open to increase a counter-rotational torque on the rotor assembly of the turbine engine in opposition to the starter motor, wherein the starter motor and plurality of variable stator vanes cooperate to control a motoring speed of the rotor assembly such that thermal rotor bow in the turbine engine is mitigated.

2. The method in accordance with claim 1, wherein actuating a plurality of variable stator vanes comprises adjusting a position of the plurality of variable stator vanes such that the motoring speed of the turbine engine is greater than a predetermined motoring speed.

3. The method in accordance with claim 1, wherein actuating a plurality of variable stator vanes comprises:
    monitoring a vibratory response of the turbine engine as the turbine engine is rotated at the motoring speed; and
    adjusting the position of the plurality of variable stator vanes such that the vibratory response is less than a predetermined threshold.

4. The method in accordance with claim 1, wherein actuating a plurality of variable stator vanes comprises adjusting a position of the plurality of variable stator vanes such that the motoring speed of the turbine engine is maximized relative to a resonant rotational speed of the turbine engine.

5. The method in accordance with claim 4, wherein adjusting the position of the plurality of stator vanes comprises:
    monitoring a vibratory response of the turbine engine as the turbine engine is rotated at the motoring speed; and
    adjusting the position of the plurality of variable stator vanes such that the motoring speed of the turbine engine increases when the vibratory response decreases.

6. The method in accordance with claim 4, wherein adjusting the position of the plurality of stator vanes comprises:
    monitoring a temperature within the turbine engine as the turbine engine is rotated at the motoring speed; and
    adjusting the position of the plurality of variable stator vanes such that the motoring speed of the turbine engine increases when the temperature decreases.

7. The method in accordance with claim 1 further comprising:
    actuating the starter motor at a power output for rotating the turbine engine at a motoring speed greater than a resonant rotational speed of the turbine engine; and
    adjusting a position of the plurality of variable stator vanes into an at least partially open position to reduce the motoring speed of the turbine engine.

8. The method in accordance with claim 1 further comprising shutting down the starter motor such that the starter motor is actuated for an amount of time less than or equal to a predetermined duration.

9. A turbine engine comprising:
    a starter motor;
    a compressor assembly comprising a plurality of variable stator vanes; and
    a computing device monitoring at least one parameter of the turbine engine and coupled in communication with said starter motor and said plurality of variable stator vanes to mitigate thermal rotor bow during startup of the turbine engine, said computing device configured to:
        actuate said starter motor of the turbine engine such that a motoring speed of the turbine engine increases;
        monitor a temperature within the turbine engine as the turbine engine is rotated at the motoring speed;

actuate said plurality of variable stator vanes such that said plurality of variable stator vanes are at least partially open to control the motoring speed of the turbine engine; and adjust a position of the plurality of variable stator vanes such that the motoring speed of the turbine engine increases when the temperature decreases, wherein thermal rotor bow in the turbine engine is mitigated.

10. The turbine engine in accordance with claim 9, wherein said computing device is further configured to adjust a position of the plurality of variable stator vanes such that the motoring speed of the turbine engine is greater than a predetermined motoring speed.

11. The turbine engine in accordance with claim 9, wherein said computing device is further configured to:
monitor a vibratory response of the turbine engine as the turbine engine is rotated at the motoring speed; and
adjust the position of said plurality of variable stator vanes such that the vibratory response is less than a predetermined threshold.

12. The turbine engine in accordance with claim 9, wherein said computing device is further configured to adjust a position of said plurality of variable stator vanes such that the motoring speed of the turbine engine is maximized relative to a resonant rotational speed of the turbine engine.

13. The turbine engine in accordance with claim 12, wherein said computing device is further configured to:
monitor a vibratory response of the turbine engine as the turbine engine is rotated at the motoring speed; and
adjust the position of said plurality of variable stator vanes such that the motoring speed of the turbine engine increases when the vibratory response decreases.

14. The turbine engine in accordance with claim 9, wherein said computing device is further configured to:
actuate said starter motor at a power output for rotating the turbine engine at a motoring speed greater than a resonant rotational speed of the turbine engine; and
adjust a position of said plurality of variable stator vanes into an at least partially open position to reduce the motoring speed of the turbine engine.

15. The turbine engine in accordance with claim 9, wherein said computing device is further configured to shut down said starter motor such that said starter motor is actuated for an amount of time less than or equal to a predetermined duration.

16. A non-transitory computer-readable medium having computer-executable instructions embodied thereon for use in operating a turbine engine, wherein, when executed by at least one processor, the computer-executable instructions cause the processor to:
monitor at least one parameter related to thermal rotor bow of the turbine engine and in response to the at least one parameter, the computer-executable instructions cause the processor to:
actuate a starter motor of the turbine engine during startup such that a motoring speed of the turbine engine increases;
monitoring a temperature within the turbine engine as the turbine engine is rotated at the motoring speed; and
actuate a plurality of variable stator vanes of the turbine engine such that the plurality of variable stator vanes are at least partially open to control the motoring speed of the turbine engine and such that the motoring speed of the turbine engine increases when the temperature decreases, wherein the actuating of the starter motor and plurality of variable stator vanes mitigates thermal rotor bow in turbine engine during startup.

17. The non-transitory computer-readable media in accordance with claim 16, wherein the computer-executable instructions further cause the processor to:
monitor a vibratory response of the turbine engine as the turbine engine is rotated at the motoring speed; and
adjust the position of the plurality of variable stator vanes such that the vibratory response is less than a predetermined threshold.

18. The non-transitory computer-readable media in accordance with claim 16, wherein the computer-executable instructions further cause the processor to adjust a position of the plurality of variable stator vanes such that the motoring speed of the turbine engine is maximized relative to a resonant rotational speed of the turbine engine.

19. The non-transitory computer-readable media in accordance with claim 18, wherein the computer-executable instructions further cause the processor to:
monitor a vibratory response of the turbine engine as the turbine engine is rotated at the motoring speed; and
adjust the position of the plurality of variable stator vanes such that the motoring speed of the turbine engine increases when the vibratory response decreases.

20. The non-transitory computer-readable media in accordance with claim 16, wherein the computer-executable instructions further cause the processor to:
actuate the starter motor at a power output for rotating the turbine engine at a motoring speed greater than a resonant rotational speed of the turbine engine; and
adjust a position of the plurality of variable stator vanes into an at least partially open position to reduce the motoring speed of the turbine engine.

21. The non-transitory computer-readable media in accordance with claim 16, wherein the computer-executable instructions further cause the processor to shut down the starter motor such that the starter motor is actuated for an amount of time less than or equal to a predetermined duration.

* * * * *